(12) United States Patent
Ohta et al.

(10) Patent No.: US 7,948,713 B2
(45) Date of Patent: May 24, 2011

(54) MAGNETIC HEAD SLIDER USING GIANT MAGNETOSTRICTIVE MATERIAL

(75) Inventors: Naoki Ohta, Tokyo (JP); Kei Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 1115 days.

(21) Appl. No.: 11/622,697

(22) Filed: Jan. 12, 2007

(65) Prior Publication Data

US 2008/0170339 A1 Jul. 17, 2008

(51) Int. Cl.
*G11B 5/60* (2006.01)
*G11B 21/24* (2006.01)

(52) U.S. Cl. .................... 360/235.2; 360/294.7
(58) Field of Classification Search .... 360/235.1–235.3, 360/294.7
See application file for complete search history.

(56) References Cited

U.S. PATENT DOCUMENTS

| | | | | |
|---|---|---|---|---|
| 3,732,552 A | * | 5/1973 | Walraven | 360/75 |
| 4,374,402 A | * | 2/1983 | Blessom et al. | 360/266.2 |
| 4,499,515 A | * | 2/1985 | Piotrowski et al. | 360/328 |
| 4,520,413 A | * | 5/1985 | Piotrowski et al. | 360/328 |
| 4,605,977 A | * | 8/1986 | Matthews | 360/234.7 |
| 5,021,906 A | * | 6/1991 | Chang et al. | 360/235.1 |
| 5,031,055 A | * | 7/1991 | Yanagisawa | 360/294.7 |
| 5,491,559 A | * | 2/1996 | Buechler | 358/3.32 |
| 5,745,319 A | * | 4/1998 | Takekado et al. | 360/78.05 |
| 5,991,113 A | | 11/1999 | Meyer et al. | |
| 6,313,973 B1 | * | 11/2001 | Fuke et al. | 360/324.1 |
| 6,760,195 B2 | * | 7/2004 | Rafaelof | 360/264.3 |
| 6,870,709 B2 | * | 3/2005 | Shimanouchi et al. | 360/294.4 |
| 6,992,865 B2 | * | 1/2006 | Thurn et al. | 360/294.7 |
| 7,046,483 B2 | * | 5/2006 | Erpelding | 360/245.3 |
| 7,064,933 B2 | * | 6/2006 | Macken et al. | 360/294.7 |
| 7,154,696 B2 | * | 12/2006 | Nikitin et al. | 360/75 |
| 7,262,937 B2 | * | 8/2007 | Pendray et al. | 360/235.1 |
| 7,385,789 B2 | * | 6/2008 | Hu et al. | 360/294.7 |
| 7,558,027 B2 | * | 7/2009 | Hirata et al. | 360/319 |
| 7,660,080 B1 | * | 2/2010 | Liu et al. | 360/294.7 |
| 7,738,216 B2 | * | 6/2010 | Sato et al. | 360/294.7 |
| 7,755,867 B2 | * | 7/2010 | Mei et al. | 360/294.7 |
| 2001/0019467 A1 | * | 9/2001 | Otsuka et al. | 360/235.2 |
| 2003/0174430 A1 | | 9/2003 | Takahashi et al. | |
| 2006/0222904 A1 | * | 10/2006 | Hsia et al. | 428/832 |

FOREIGN PATENT DOCUMENTS

| | | |
|---|---|---|
| JP | 5-28683 | 2/1993 |
| JP | 05151734 A * | 6/1993 |
| JP | 2000-82204 | 3/2000 |
| JP | 2005-340429 | 12/2005 |
| JP | 2006-213984 | 8/2006 |

OTHER PUBLICATIONS

Partial English Translation by computer of JP 05-151734, cited by Examiner herewith, pp. 1-5.*

* cited by examiner

*Primary Examiner* — Brian E Miller
(74) *Attorney, Agent, or Firm* — Oblon, Spivak, McClelland, Maier & Neustadt, L.L.P.

(57) ABSTRACT

A magnetic head slider includes at least one thin-film magnetic head formed on a trailing surface of the magnetic head slider, and an ABS to be faced a magnetic disk in operation. At least a part of the ABS is made of a giant magnetostrictive material.

5 Claims, 9 Drawing Sheets

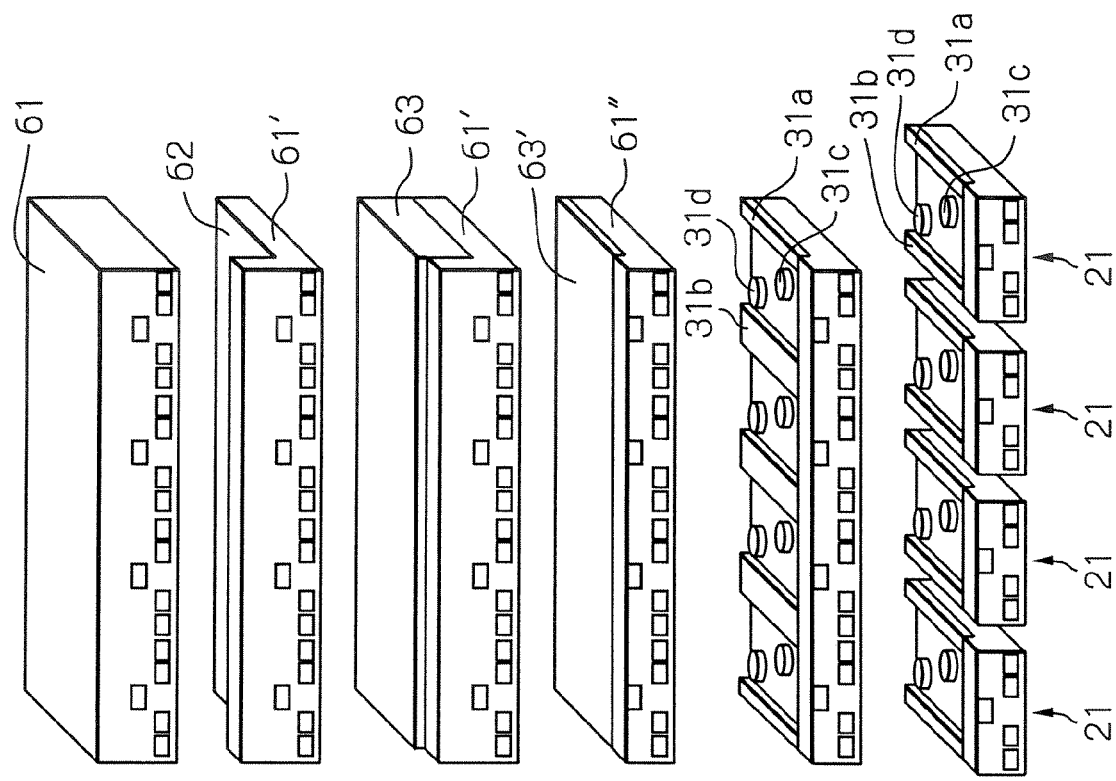
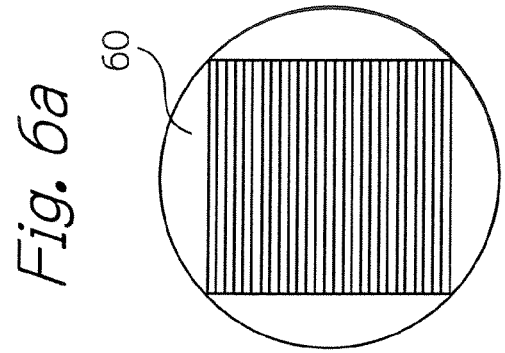

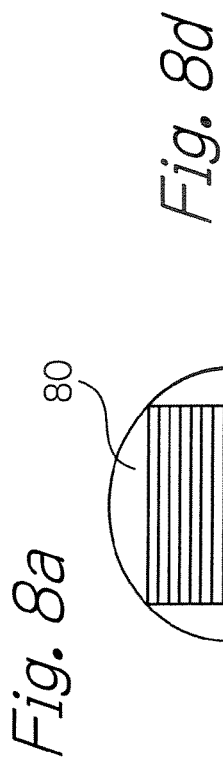
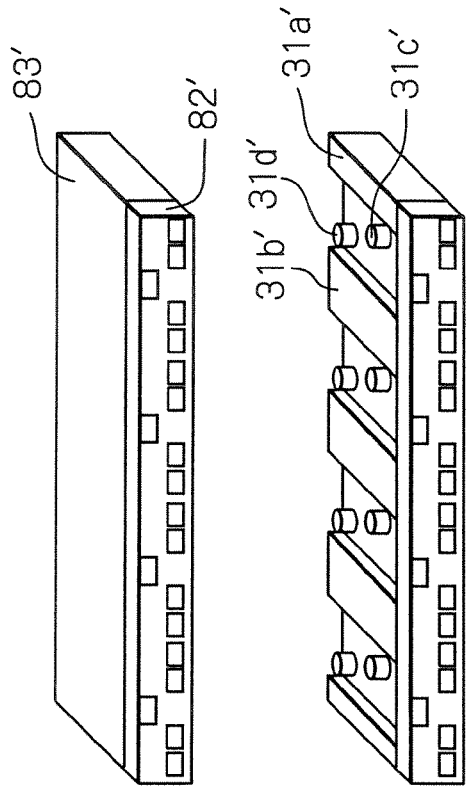
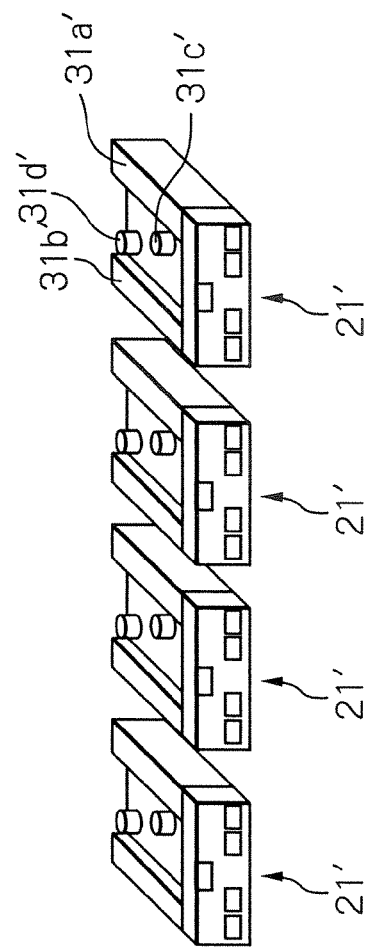
Fig. 8d
Fig. 8e
Fig. 8f
Fig. 8g
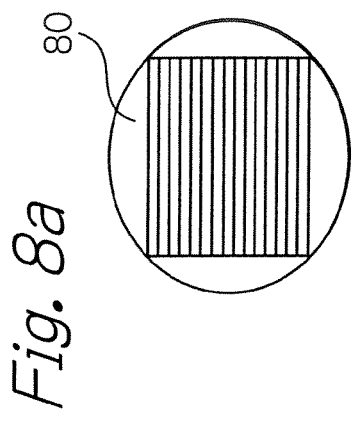
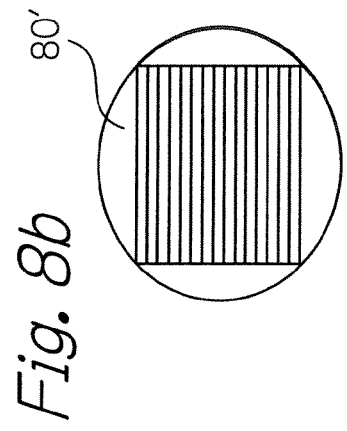
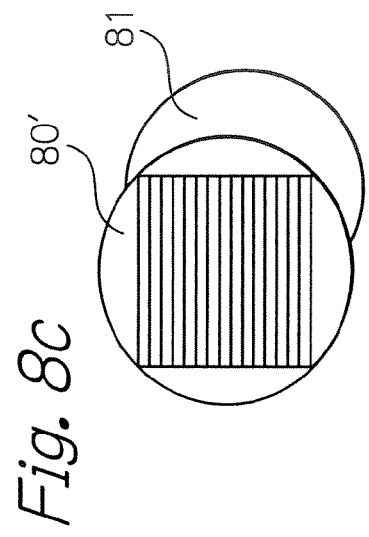
Fig. 8a
Fig. 8b
Fig. 8c

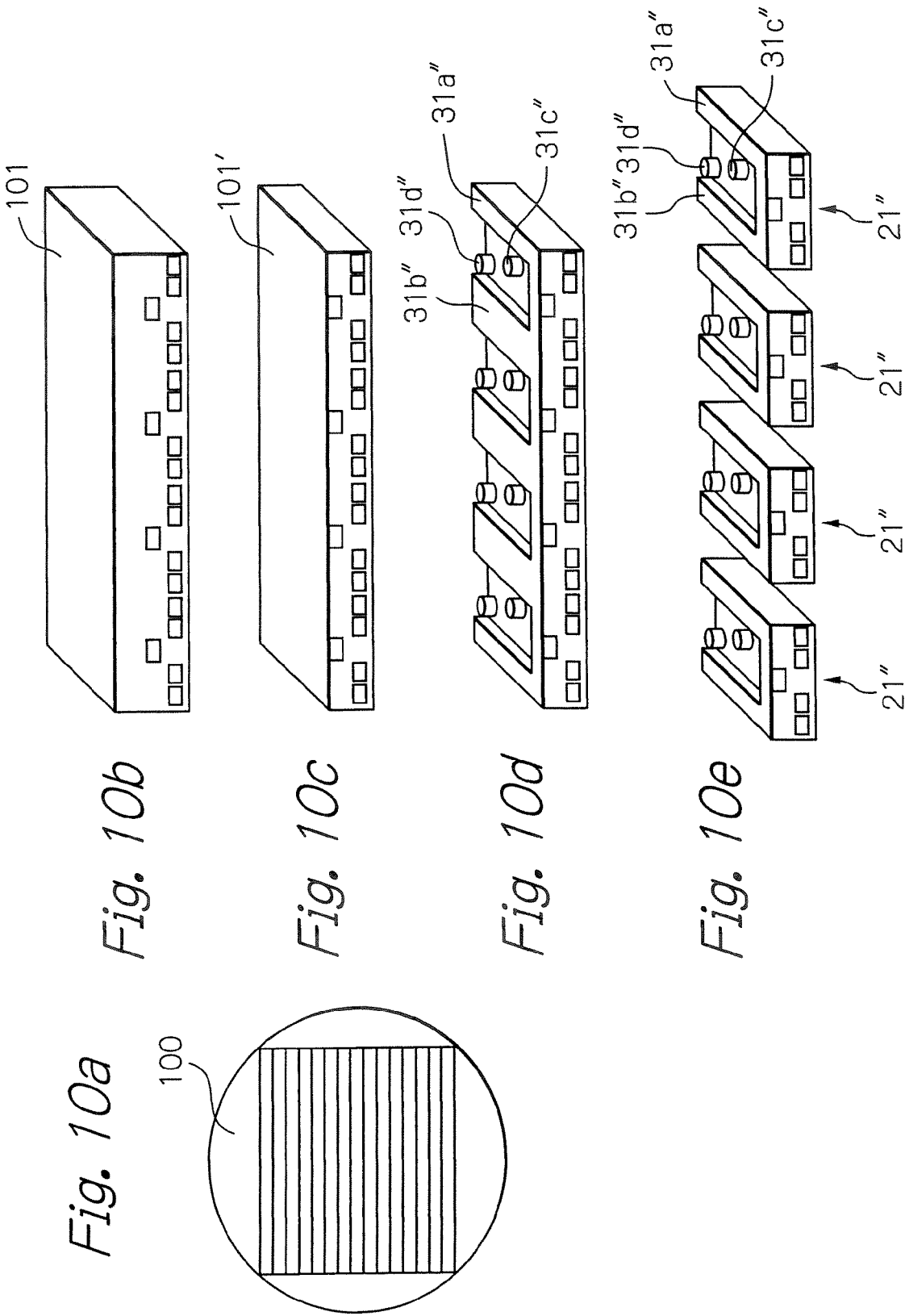

MAGNETIC HEAD SLIDER USING GIANT MAGNETOSTRICTIVE MATERIAL

BACKGROUND OF THE INVENTION

1. Field of the Invention

The present invention relates to a magnetic head slider using a giant magnetostrictive material, to a magnetic head assembly provided with the magnetic head slider and to a magnetic disk drive apparatus provided with the magnetic head assembly.

2. Description of the Related Art

In a hard disk drive (HDD) apparatus that is one kind of a magnetic disk drive apparatus, a magnetic head slider attached at a top end section of a head support member having a suspension and a support arm aerodynamically flies with keeping a predetermined space or flying height above the surface of a rotating magnetic disk. In this flying state, a thin-film magnetic head formed on the magnetic head slider performs writing of signals to the magnetic disk using magnetic field generated from an inductive write head element, and performs reading of signals by sensing a magnetic field from the magnetic disk using a magnetoresistive effect (MR) read head element. The magnetic effective distance between these magnetic head elements and the magnetic disk surface is defined as a magnetic spacing.

Recently, a track width of a thin-film magnetic head becomes narrower to satisfy the requirements for increasing data storage capacities and recording densities of the HDD apparatus and also the requirement of downsizing of the HDD apparatus. In order to work around lowering in writing ability and reading ability due to narrowing in the track width, the magnetic spacing of the recent thin-film magnetic head is determined to a very small value of about 10 nm.

U.S. Pat. No. 5,991,113 and U.S. Patent Publication No. US2003/0174430A1 disclose a method for precisely controlling such micro magnetic spacing by forming a heater near or in a head element of a magnetic head slider and by thermally expanding or protruding a part of the head element as required. Such method is called as a thermal pole tip protrusion (TPTP) method.

However, according to the conventional magnetic spacing control technique using the TPTP method, since (1) it is necessary to additionally form a heater within a limited and narrow space of the magnetic head slider, (2) it is necessary to additionally form a heater drive and control circuit in the HDD apparatus, and (3) it is necessary to additionally form on the magnetic head slider a wiring member for electrically connecting the heater and an external circuit, not only the configuration of the magnetic head slider becomes complex causing its design to make difficult and its manufacturing cost to increase but also intrinsic read/write characteristics of the thin-film magnetic head deteriorates. Further, due to heat generation of the heater, unwanted temperature increase in the magnetic head slider may be induced.

SUMMARY OF THE INVENTION

It is therefore an object of the present invention to provide a magnetic head slider, a magnetic head assembly and a magnetic disk drive apparatus, magnetic spacing control can be performed without additionally forming an electrical-mechanical element such as a heater in the magnetic head slider but with a simple structure of the magnetic head slider.

According to the present invention, a magnetic head slider includes at least one thin-film magnetic head formed on a trailing surface of the magnetic head slider, and an air bearing surface (ABS) to be faced a magnetic disk in operation. At least a part of the ABS is made of a giant magnetostrictive material.

According to the present invention, also, a magnetic head assembly includes the above-mentioned magnetic head slider and a suspension to which the magnetic head slider is fixed, for supporting this magnetic head slider. Here, the magnetic head assembly means an assembly mechanically and electrically assembling a composite thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

According to the present invention, further, a magnetic disk drive apparatus includes a magnetic disk and the above-mentioned magnetic head assembly.

Since at least a part of the ABS of the magnetic head slider is made of a giant magnetostrictive material, when the magnetic head slider is flying close to the surface of the magnetic disk, the ABS portions formed by the giant magnetostrictive material protrude toward the magnetic disk surface due to magnetic field applied from the magnetic disk. The magnetic head slider is designed so that sections near the magnetic head elements hit or contact the surface of the magnetic disk due to negative pressure induced depending upon the shape of the ABS when the ABS portions do not protrude. The magnetic field applied from the magnetic disk increases and thus the amount of the protrusion of the ABS increases when the ABS comes closer to the magnetic disk surface. If the protrusion amount increases, the flying height of the magnetic head, that is, a space between the magnetic head elements and the magnetic disk surface increases. As a result, the magnetic spacing can be adequately controlled.

Also, because such magnetic spacing control can be performed without additionally forming an electrical-mechanical element such as a heater in the magnetic head slider, not only simple configuration, easy design and reduced manufacturing cost of the magnetic head slider can be expected but also it is possible to prevent deleterious effect on the intrinsic read/write characteristics of the thin-film magnetic head from occurring. Further, since no heating due to a heater is produced, temperature of the magnetic head slider is never unnecessarily increased.

It is preferred that the at least one thin-film magnetic head is formed on a substrate made of a ceramic material, that a giant magnetostrictive material member is fixed on only a part of the substrate, the part locating at the ABS side, and that the ABS is formed on the giant magnetostrictive material member.

It is also preferred that the at least one thin-film magnetic head is formed on a substrate made of a ceramic material, that a giant magnetostrictive material member is fixed over a whole leading surface of the substrate, and that the ABS is formed on the giant magnetostrictive material member.

It is further preferred that whole of a substrate is made of a giant magnetostrictive material, and that the at least one thin-film magnetic head and the ABS are formed on the substrate.

It is also preferred that the giant magnetostrictive material is a magnetostrictive material with a raw material of the Laves type cubical crystal ($RT_2$) consisting of lanthanoid R and iron group element T.

It is further preferred that the at least one thin-film magnetic head is a thin-film magnetic head with an inductive write head element and an MR read head element.

It is still further preferred that the suspension includes a resilient flexure to which the magnetic head slider is fixed, and a load beam for supporting the flexure.

Further objects and advantages of the present invention will be apparent from the following description of the preferred embodiments of the invention as illustrated in the accompanying drawings.

BRIEF DESCRIPTION OF THE DRAWINGS

FIGS. 6a to 6g show plane views and perspective views illustrating an example of a fabrication process of the magnetic head slider shown in FIG. 3;

FIGS. 8a to 8g show plane views and perspective views illustrating an example of a fabrication process of the magnetic head slider shown in FIG. 7;

FIGS. 10a to 10e show plane views and perspective views illustrating an example of a fabrication process of the magnetic head slider shown in FIG. 9.

DESCRIPTION OF THE PREFERRED EMBODIMENTS

Figure 1:
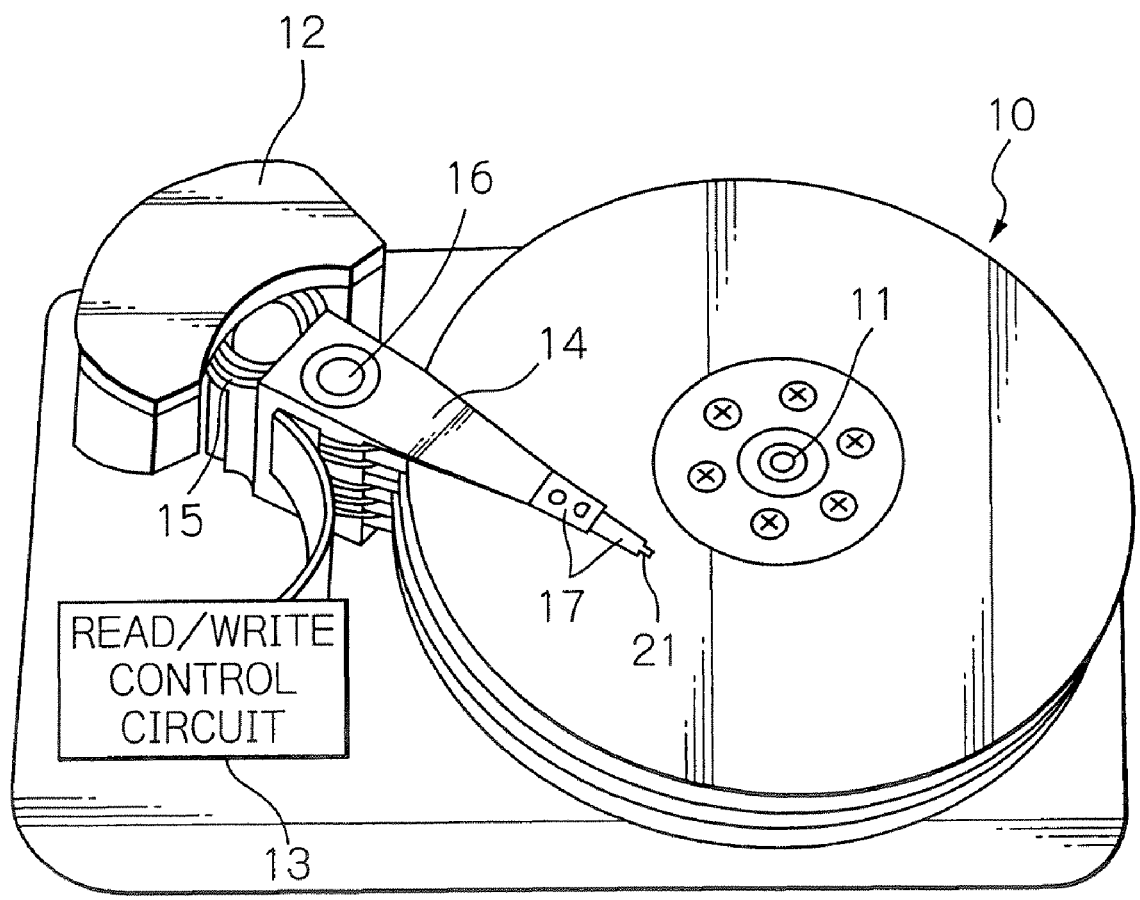
FIG. 1 shows a perspective view schematically illustrating main components of a magnetic disk drive apparatus in a preferred embodiment according to the present invention.
Figure 2:
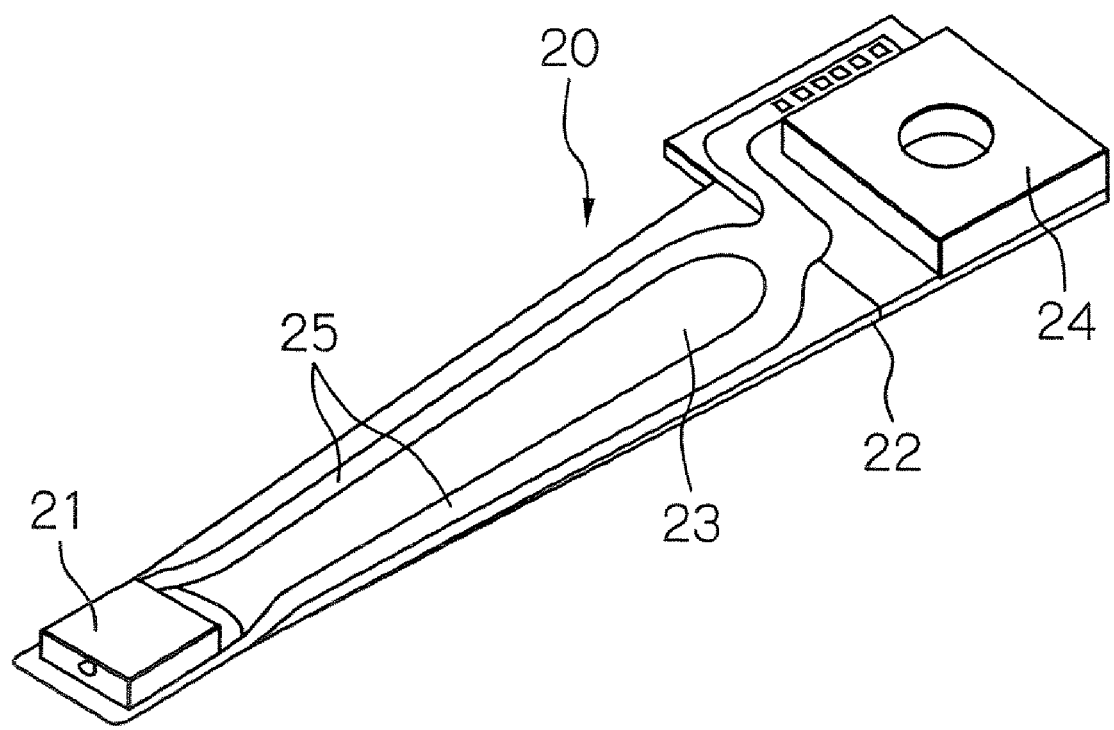
FIG. 2 shows a perspective view illustrating the whole of an HGA.
Figure 3:
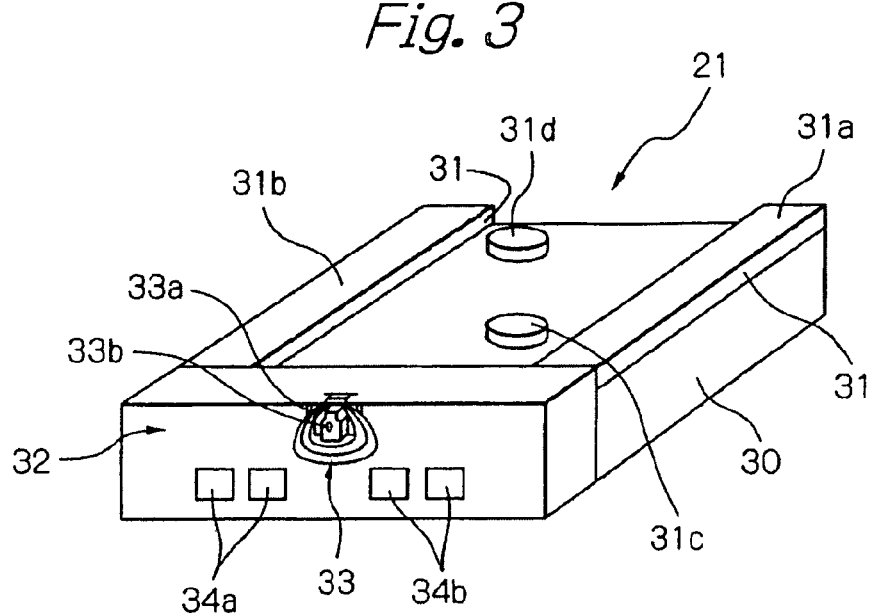
FIG. 3 shows a perspective view illustrating a magnetic head slider provided at the top end section of the HGA.
Figure 4:
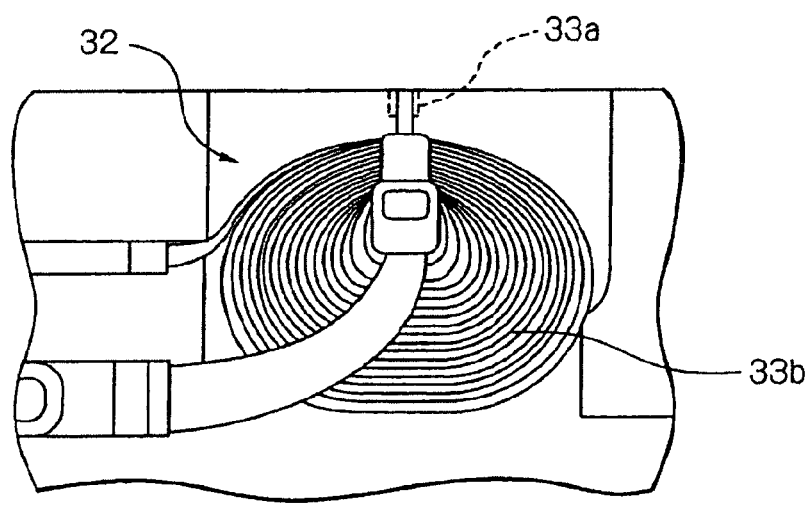
FIG. 4 shows a plane view schematically illustrating a part of a magnetic head element on an element-formed surface of the magnetic head slider shown in FIG. 3.

FIG. 1 schematically illustrates main components of a magnetic disk drive apparatus in a preferred embodiment according to the present invention, FIG. 2 illustrates the whole of an HGA, FIG. 3 illustrates a magnetic head slider provided at the top end section of the HGA, and FIG. 4 schematically illustrates a part of a magnetic head element on an element-formed surface of the magnetic head slider shown in FIG. 3.

In FIG. 1, reference numeral 10 indicates a plurality of magnetic disks 10 rotating in operation around a rotation axis of a spindle motor 11, 12 indicates an assembly carriage device for positioning a thin-film magnetic head formed on a magnetic head slider on a track, and 13 indicates a read/write control circuit for controlling the read/write operations of the thin-film magnetic head, respectively.

The assembly carriage device 12 has a plurality of drive arms 14. These drive arms 14 are driven by a voice coil motor (VCM) 15 to rotate around a pivot bearing axis 16, and stacked in the direction along the axis 16. An HGA 17 is fixed at the top end section of each drive arm 14. The magnetic head slider is attached to each HGA 17 so that the thin-film magnetic head opposes a surface of each magnetic disk 10. Although in the above-description a plurality of the magnetic disks 10, drive arms 14, HGAs 17 and magnetic head sliders are mounted in the magnetic disk drive apparatus, each of these may be single in modifications.

As shown in FIG. 2, the HGA is constituted by fixing the magnetic head slider 21 having the thin-film magnetic head at the top end section of a suspension 20, and by electrically connecting one end of a wiring member 25 to signal electrodes of the magnetic head slider 21.

The suspension 20 mainly consists of a load beam 22 for generating a load to be applied to the magnetic head slider, a resilient flexure 23 fixed and supported on the load beam 22, a base plate 24 fixed to the base end section of the load beam 22, and the wiring member 25 formed on the flexure 23 and the load beam 22. The wiring member 25 has trace conductors and connection pads electrically connected to both end of the respective trace conductors.

It is apparent that the structure of the suspension in the HGA of the present invention is not limited to aforementioned structure. Although it is not shown, a head drive IC chip may be mounted on the suspension 20.

As shown in FIG. 3, the magnetic head slider 21 in this embodiment has a substrate 30 made of a ceramic material such as AlTiC (alumna ($Al_2O_3$)-titanium carbide (TiC)), and a giant magnetostrictive material member 31 fixed to a part of the substrate 30.

As shown in FIG. 4, a composite thin-film magnetic head 33 consisting of an MR read head element 33a and an inductive write head element 33b stacked each other, and four signal electrodes 34a and 34b connected to these head elements 33a and 33b are formed on the element-formed surface 32 of the substrate 30 or on a trailing surface of the magnetic head slider. The positions of the signal electrodes are not limited to that shown in FIG. 3.

Giant magnetostrictive material members 31 are fixed on only a part of the substrate 30, locating at the ABS and leading surface side. The ABSs are formed on these giant magnetostrictive material members 31. More concretely, in this embodiment, a pair of rails 31a and 31b with surfaces constituting the ABSs and a pair of islands 31c and 31d with surfaces constituting the ABSs are formed on a part of the substrate 30 at the ABS side. Shapes, positions and the number of these rails and islands are not limited to these illustrated in FIG. 3.

It is desired that the giant magnetostrictive material members 31 are made of a giant magnetostrictive material such as in this embodiment a magnetostrictive material with a raw material of the Laves type cubical crystal ($RT_2$) consisting of lanthanoid R and iron group element T of iron (Fe), nickel (Ni) or cobalt (Co) for example. Table 1 indicates compositions and magnetostrictive constants of known giant magnetostrictive materials.

TABLE 1

|  | Magnetostrictive Constant λ100 (ppm) | Magnetostrictive Constant λ110 (ppm) |
| --- | --- | --- |
| $Co_{0.8}Fe_{2.2}O_4$ | −560 | 120 |
| $Co_{0.1}Ni_{0.9}O_4$ | −109 | −38.6 |
| $Ti_{0.56}Fe_{2.44}O_4$ | 170 | 92 |

Figure 5A:
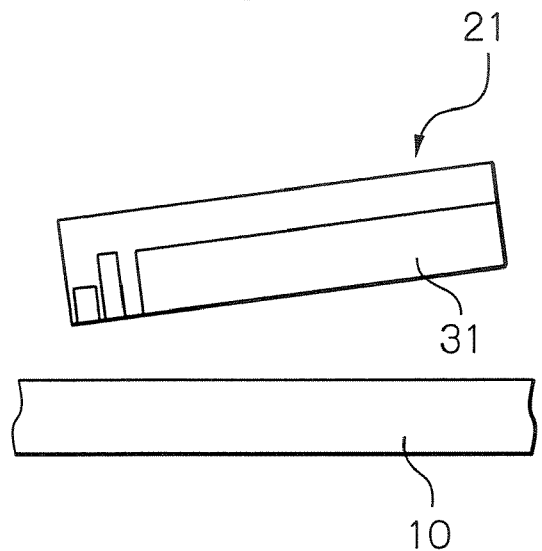
FIGS. 5a to 5c show views illustrating flying operations of the magnetic head slider shown in FIG. 3.
Figure 5B:
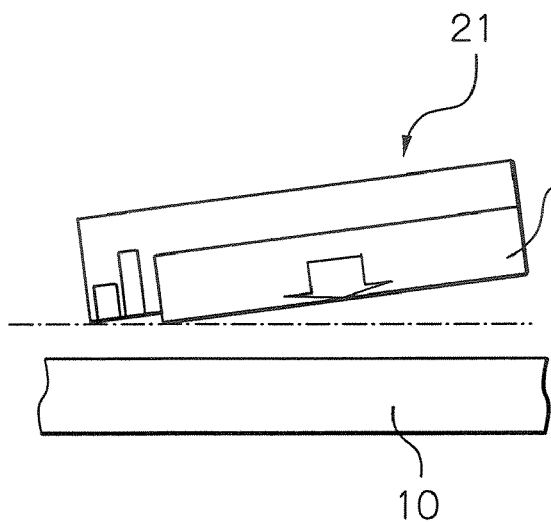
Figure 5C:
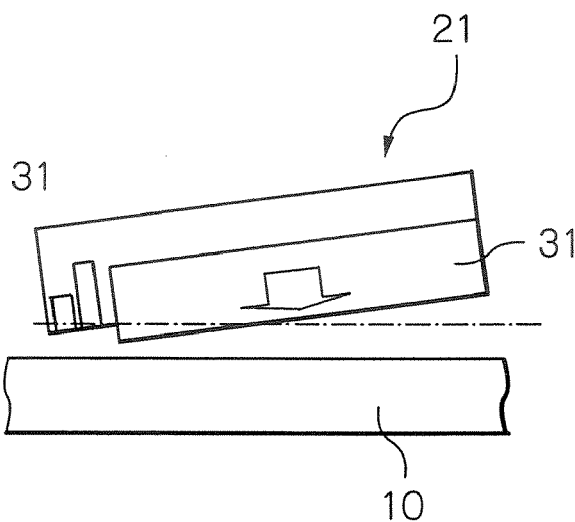

FIGS. 5a to 5c illustrate flying operations of this magnetic head slider.

As shown in FIG. 5a, when the magnetic head slider 21 is flying away from the surface of the magnetic disk 10, magnetic field from the magnetic disk 10 is low and thus the ABS portions formed by the giant magnetostrictive material members 31 do not protrude toward the magnetic disk surface. The ABS is designed so that sections near the magnetic head elements hit or contact the surface of the magnetic disk rotating at a steady rotational speed when the ABS portions do not protrude.

As shown in FIG. 5b, when the magnetic head slider 21 is flying close to the surface of the magnetic disk 10, the ABS portions formed by the giant magnetostrictive material members 31 protrude toward the magnetic disk surface due to magnetic field applied from the magnetic disk 10. The amount of protrusion increases as shown in FIG. 5c when the ABS comes closer to the magnetic disk surface. If the protrusion amount increases, the flying height of the magnetic head slider, that is, a space between the magnetic head elements and the magnetic disk surface increases. As a result, crash of the magnetic head element portion against the magnetic disk surface can be prevented from occurring and the magnetic spacing can be adequately controlled.

Leakage magnetic field from the magnetic disk is in general about 500 Oe to 1 kOe. Because the giant magnetostrictive material with a raw material of the Laves type cubical crystal ($RT_2$) consisting of lanthanoid R and iron group element T has a magnetostrictive displacement ratio of about 1200 ppm at the application of a magnetic field of 1 kOe, if the magnetic flux is uniformly applied to this giant magnetostrictive material with 0.1 mm thickness, the flying height can be adjusted in a range up to about 120 nm.

According to this embodiment, such magnetic spacing control can be performed without additionally forming an electrical-mechanical element such as a heater in the magnetic head slider 21 but with forming only the giant magnetostrictive material members 31 at the ABS portions. Thus, not only simple configuration, easy design and reduced manufacturing cost of the magnetic head slider can be expected but also it is possible to prevent deleterious effect on the intrinsic read/write characteristics of the thin-film magnetic head from occurring. Also, since no heating due to a heater is produced, temperature of the magnetic head slider 21 is never unnecessarily increased. Further, since the magnetic response performance of the giant magnetostrictive material members 31 is extremely quick, excellent disturbance resistance due to the quick response to the applied magnetic field can be expected.

FIGS. 6a to 6g illustrate an example of a fabrication process of the magnetic head slider of this embodiment. Hereinafter, a manufacturing process of the magnetic head slider of this embodiment will be described using these figures.

First, as shown in FIG. 6a, many thin-film magnetic heads are fabricated, using the thin-film integration technique, in matrix on a wafer 60 that is made of a ceramic material such as AlTiC.

Then, as shown in FIG. 6b, the wafer 60 is cut to separate into bar members 61 each constituting a plurality of magnetic head sliders juncturally aligned in a line.

Then, as shown in FIG. 6c, a part 62 of each bar member 61 at the ABS and leading surface side is removed to form a stepped bar member 61'.

Thereafter, as shown in FIG. 6d, a giant magnetostrictive material member 63 with a plate shape is adhered to this part 62. Such giant magnetostrictive material member 63 is in general fabricated by Czochralski process, but in this embodiment, fabricated by pulverizing giant magnetostrictive material, by molding the pulverized material and by sintering the molded material. The giant magnetostrictive material is fabricated as an iron group element that has a high Curie temperature is added to a main raw material of lanthanoid that has a large magnetostrictive ratio, hydrogen is occluded in a part of the material, and then thus obtained material is sintered under hydrogen environment.

Then, as shown in FIG. 6e, a surface at the ABS side of the bar member 61' with the adhered giant magnetostrictive material member 63 is lapped to obtain a bar member 61" and a giant magnetostrictive material member 63'.

Then, as shown in FIG. 6f, the surface of thus formed giant magnetostrictive material member 63' is etched to form the rails 31a and 31b and the islands 31c and 31d.

Thereafter, as shown FIG. 6g, the bar member is cut to separate into individual magnetic head sliders 21.

Figure 7:
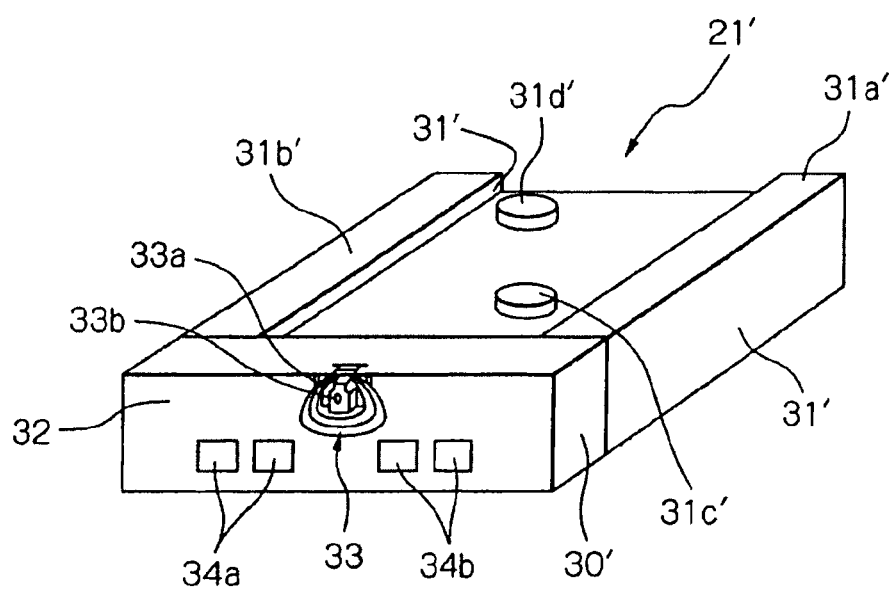
FIG. 7 shows a perspective view illustrating a magnetic head slider in another embodiment according to the present invention.

FIG. 7 illustrates a magnetic head slider in another embodiment according to the present invention.

As shown in the figure, the magnetic head slider 21' in this embodiment has a substrate 30' made of a ceramic material such as AlTiC, and a giant magnetostrictive material member 31' fixed to a part of the substrate 30'.

A composite thin-film magnetic head 33 consisting of an MR read head element 33a and an inductive write head element 33b stacked each other, and four signal electrodes 34a and 34b connected to these head elements 33a and 33b are formed on the element-formed surface 32 of the substrate 30 or on a trailing surface of the magnetic head slider. The positions of the signal electrodes are not limited to that shown in FIG. 7.

In this embodiment, the giant magnetostrictive material member 31' is fixed to the whole surface at the leading side surface of the substrate 30'. The ABSs are formed on this giant magnetostrictive material member 31'. More concretely, in this embodiment, a pair of rails 31a' and 31b' with surfaces constituting the ABSs and a pair of islands 31c' and 31d' with surfaces constituting the ABSs are formed on the ABS side surface of the substrate 30'. Shapes, positions and the number of these rails and islands are not limited to these illustrated in FIG. 7.

Material of the giant magnetostrictive material member 31', and other configurations, operations and advantages of this embodiment are the same as those of the embodiment of FIG. 1.

FIGS. 8a to 8g illustrate an example of a fabrication process of the magnetic head slider of this embodiment. Hereinafter, a manufacturing process of the magnetic head slider of this embodiment will be described using these figures.

First, as shown in FIG. 8a, many thin-film magnetic heads are fabricated, using the thin-film integration technique, in matrix on a wafer 80 that is made of a ceramic material such as AlTiC.

Then, as shown in FIG. 8b, a back surface of the wafer 80 is lapped.

Then, as shown in FIG. 8c, a giant magnetostrictive material member 81 with the same shape and size as this wafer 80' is adhered to the lapped back surface of the wafer 80'. Such giant magnetostrictive material member 81 is in general fabricated by Czochralski process, but in this embodiment, fabricated by pulverizing giant magnetostrictive material, by molding the pulverized material and by sintering the molded material. The giant magnetostrictive material is fabricated as an iron group element that has a high Curie temperature is added to a main raw material of lanthanoid that has a large magnetostrictive ratio, hydrogen is occluded in a part of the material, and then thus obtained material is sintered under hydrogen environment.

Then, as shown in FIG. 8d, the wafer 80' with the adhered giant magnetostrictive material member 81 is cut to separate into bar members 82 each constituting a plurality of magnetic head sliders juncturally aligned in a line and a giant magnetostrictive material member 83 fixed to the whole surface at the leading side surface of the juncturally aligned magnetic head sliders.

Then, as shown in FIG. 8e, a surface at the ABS side of the bar member 82 with the giant magnetostrictive material member 83 adhered to the whole surface at the leading side surface is lapped to obtain a bar member 82' and a giant magnetostrictive material member 83'.

Then, as shown in FIG. 8f, the surface of thus formed giant magnetostrictive material member 83' is etched to form the rails 31a' and 31b' and the islands 31c' and 31d'.

Thereafter, as shown FIG. 8g, the bar member is cut to separate into individual magnetic head sliders 21'.

Figure 9:
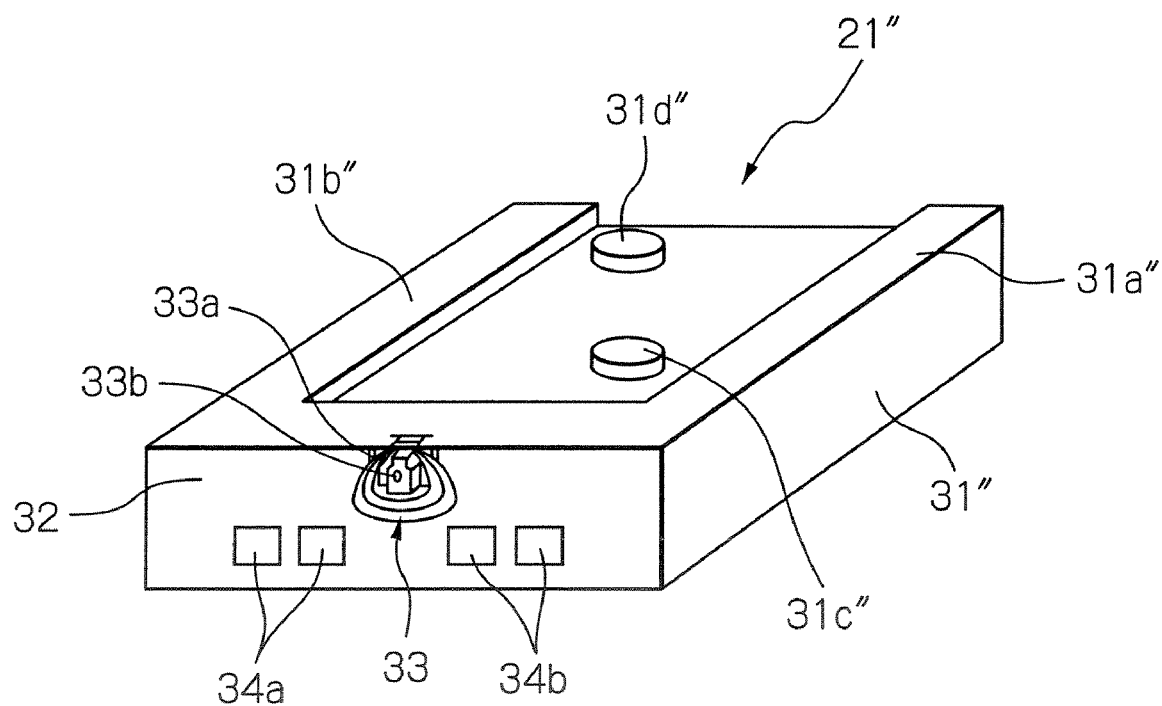
FIG. 9 shows a perspective view illustrating a magnetic head slider in further embodiment according to the present invention.

FIG. 9 illustrates a magnetic head slider in further embodiment according to the present invention.

As shown in the figure, the magnetic head slider 21' in this embodiment has a substrate 31" whole of which is made of a giant magnetostrictive material.

A composite thin-film magnetic head 33 consisting of an MR read head element 33a and an inductive write head element 33b stacked each other, and four signal electrodes 34a and 34b connected to these head elements 33a and 33b are formed on the element-formed surface 32 of the substrate 31" or on a trailing surface of the magnetic head slider. The positions of the signal electrodes are not limited to that shown in FIG. 9.

In this embodiment, the ABSs are formed on the substrate 31" made of the giant magnetostrictive material member. More concretely, in this embodiment, a pair of rails 31a" and 31b" with surfaces constituting the ABSs and a pair of islands 31c" and 31d" with surfaces constituting the ABSs are formed on the ABS side surface of the substrate 31" made of the giant magnetostrictive material. Shapes, positions and the number of these rails and islands are not limited to these illustrated in FIG. 9.

Material of the giant magnetostrictive material substrate 31', and other configurations, operations and advantages of this embodiment are the same as those of the embodiment of FIG. 1.

FIGS. 10a to 10e illustrate an example of a fabrication process of the magnetic head slider of this embodiment. Hereinafter, a manufacturing process of the magnetic head slider of this embodiment will be described using these figures.

First, as shown in FIG. 10a, many thin-film magnetic heads are fabricated, using the thin-film integration technique, in matrix on a wafer 100 that is made of a giant magnetostrictive material. Such giant magnetostrictive material substrate 100 is in general fabricated by Czochralski process, but in this embodiment, fabricated by pulverizing giant magnetostrictive material, by molding the pulverized material and by sintering the molded material. The giant magnetostrictive material is fabricated as an iron group element that has a high Curie temperature is added to a main raw material of lanthanoid that has a large magnetostrictive ratio, hydrogen is occluded in a part of the material, and then thus obtained material is sintered under hydrogen environment.

Then, as shown in FIG. 10b, the wafer 100 is cut to separate into bar members 101 each constituting a plurality of magnetic head sliders juncturally aligned in a line.

Then, as shown in FIG. 10c, a surface at the ABS side of the bar member 101 is lapped to obtain a bar member 101'.

Then, as shown in FIG. 10d, the surface of thus formed bar member 101' is etched to form the rails 31a" and 31b" and the islands 31c' and 31d'.

Thereafter, as shown FIG. 10e, the bar member is cut to separate into individual magnetic head sliders 21'.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus including a magnetic disk, a magnetic head slider, and a suspension fixing and supporting said magnetic head slider, said magnetic head slider comprising:
    at least one thin-film magnetic head formed on a trailing surface of said magnetic head slider;
    an air bearing surface to face a magnetic disk in operation; and
    a giant magnetostrictive material member fixed to a substrate, wherein
    said air bearing surface is formed on said giant magnetostrictive material member such that a space between said at least one thin-film magnetic head and a surface of said magnetic disk increases when said air bearing surface comes closer to the magnetic disk surface.

2. The magnetic disk drive apparatus as claimed in claim 1, wherein said giant magnetostrictive material is a magnetostrictive material with a raw material of the Laves type cubical crystal ($RT_2$) consisting of lanthanoid R and iron group element T.

3. The magnetic disk drive apparatus as claimed in claim 1, wherein said at least one thin-film magnetic head is a thin-film magnetic head with an inductive write head element and a magnetoresistive effect read head element.

4. The magnetic disk drive apparatus as claimed in claim 1, wherein said suspension comprises a resilient flexure to which said magnetic head slider is fixed, and a load beam for supporting said flexure.

5. The magnetic disk drive apparatus as claimed in claim 1, wherein said at least one thin-film magnetic head is formed on the trailing surface of a magnetic head slider made of a ceramic material.

* * * * *